J. H. GRAVELL.
SLUG WELDING.
APPLICATION FILED AUG. 20, 1919.

1,354,293.

Patented Sept. 28, 1920.

INVENTOR
James H. Gravell
BY
Townsend & Decker
ATTORNEYS

UNITED STATES PATENT OFFICE.

JAMES H. GRAVELL, OF ELKINS PARK, PENNSYLVANIA, ASSIGNOR TO THOMSON SPOT WELDER COMPANY, OF BOSTON, MASSACHUSETTS, A CORPORATION OF MASSACHUSETTS.

SLUG-WELDING.

1,354,293.  Specification of Letters Patent. Patented Sept. 28, 1920.

Application filed August 20, 1919. Serial No. 318,654.

*To all whom it may concern:*

Be it known that I, JAMES H. GRAVELL, a citizen of the United States, and a resident of Elkins Park, in the county of Montgomery and State of Pennsylvania, have invented certain new and useful Improvements in Slug-Welding, of which the following is a specification.

My invention relates to that type of electric welding apparatus in which an electrode is employed for supplying current and applying pressure by its end to a welding piece, slug or button of conducting material applied between the contact end of the electrode and the work for the purpose of welding said piece or button to the work and to weld portions of the work itself beneath said welding piece together.

The process of welding by an apparatus of this character is sometimes termed "slug welding" and to economize electrical current it is usual to place a slug on each side of the work, although the process is frequently practised by using the slug on one side only.

The method has not gone into general practice, however, owing largely to the time and accuracy required to place the slug in the exact position required which is particularly necessary to do that they may be in perfect alinement when two slugs are employed, in order to secure a good weld between the pieces of work to which they are applied.

The purpose of my invention is to provide means whereby the slug may be readily located in the exact position required and whereby, when two slugs are employed, they may be quickly alined thereby saving considerable time in the process.

While I have described my invention hereafter as applied to double slug welding, that is to say, to the process as practised by placing slugs on opposite sides of the work, it will be readily understood that the device may be used to advantage where only one slug on one side of the work is used.

The invention consists essentially in providing the contact end of the welding electrode or electrodes with means for locating the slug on said contact end and with a magnetizing coil or other magnetizing means whereby the electrode itself is magnetized and the slug is held to the terminal in the located position thereon.

Figure 1:
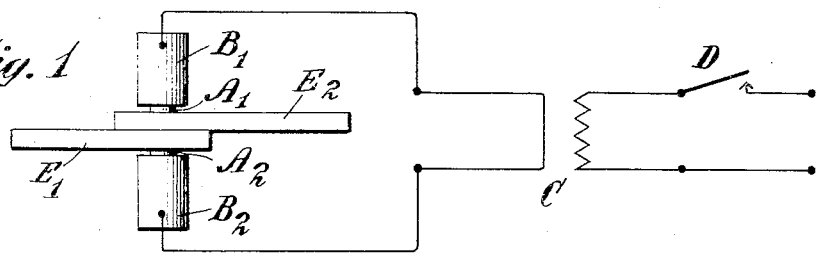
Figure 1 illustrates in a diagrammatic way the operation of slug welding as conducted by machines or apparatus as previously constructed.

Referring to Fig. 1, the process of slug welding as conducted by previous constructions or forms of apparatus is shown. $B^1$ and $B^2$ are the electrodes of a welding machine. These electrodes are movably secured in alinement by the various members comprising the welding machine (not shown) and are the terminals of a welding transformer C. In the primary of the welding circuit is an operating switch D. The operation is carried out by placing the slugs on the work, bringing the terminals in contact with the slugs with sufficient pressure to securely hold them in position and force the two overlapped plates or sheets in contact directly beneath the slugs. The circuit is then closed by the switch D and the current passed from one terminal to the other terminal through the slugs and the work until the work is sufficiently heated to form a weld. Additional pressure is then exerted between the terminals and the work and the current interrupted, forming an isolated weld or what is known as a slug weld.

In carrying out the process by the apparatus shown and in the manner described, it is evident that considerable skill and patience are required to accurately place and hold the slugs on the work in the desired position with relation thereto preparatory to bringing the terminals to bear on them.

Figure 2:
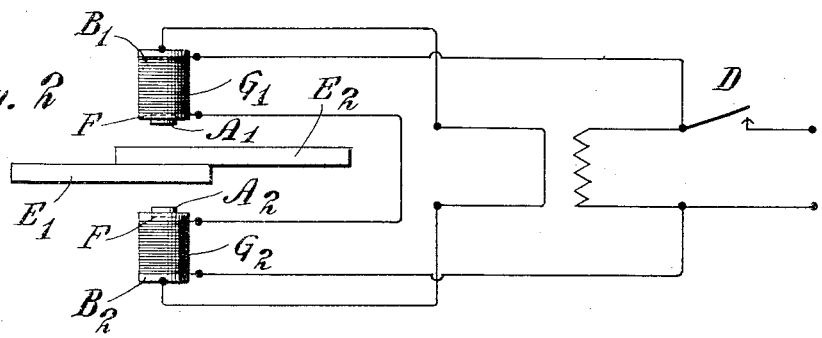
Fig. 2 illustrates the process of slug welding as it may be conducted by the use of my invention.
Figure 3:
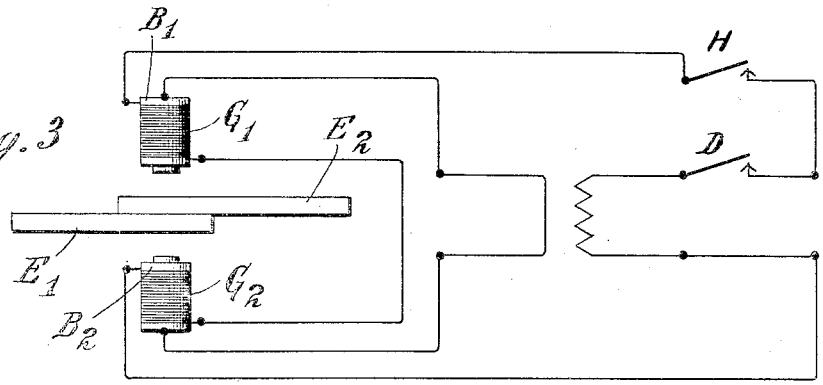
Fig. 3 is a modification in the arrangements of circuits by which the welding energy and magnetizing energy are applied.
Figure 4:
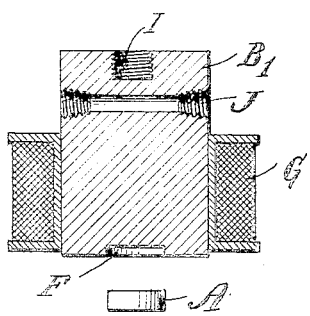
Fig. 4 is a vertical central section through an electrode for slug welding constructed in accordance with my invention.

My present invention is designed to facilitate the process to accomplish which I provide the electrode on its terminal contact or current supplying and pressure applying face with means for locating the slug in the exact position required for the work in hand and in addition provide means for magnetizing the electrode or for magnetically holding the slug to the terminal contact face in the located position. By this means the slugs, when the operation is conducted as illustrated in Fig. 2, may be located with certainty with relation to the work and to one another and in perfect alinement. The locating means may be, as indicated at F in Fig. 4, a depression, corresponding in size to the slug, or pins might also be used for the same purpose though I prefer to employ a depression as this may be formed directly in the terminal itself and requires no additional parts. In some cases it may be desirable to omit the depressions and mark the electrodes on their contact faces to form a guide or means for locating the slug. When located the slug is magnetically held to the terminal by means provided for preferably magnetizing the electrode also and which, in this case, would be of steel or magnetizable material as would be also the slug. This magnetization may be provided by windings $G^1$ and $G^2$ applied to the electrodes $B^1$ and $B^2$ which then become the core of electromagnets as shown in Figs. 2, 3 and 4. In other cases the magnetization may be provided by the windings surrounding a copper electrode. In this case the magnetism of the windings will hold the slug up against the end of the copper electrode.

The current used by the electromagnets may of course be alternating or direct but to simplify the wiring and economize apparatus, I prefer to use the same current that is used by the primary of the welding transformer or a current produced by providing a separate winding on the core of the welding transformer. In Fig. 2 the magnetizing current is placed in parallel with the primary of the transformer and is controlled by the operating switch of the welding machine. By the use of the apparatus described, instead of placing the terminals on the work and then locating the work on the electrodes in proper position with relation thereto, the welding is carried out by first assembling the work $E^1$ and $E^2$ in proper position between the electrodes $B^1$ and $B^2$, then closing the operating switch D. This magnetically energizes the electrodes $B^1$ and $B^2$. The slugs $A^1$ and $A^2$ are then placed on the electrodes so that they will be in direct alinement. The electrodes $B^1$ and $B^2$ are then moved toward each other by the welding machine so as to grip the work between the slugs. As soon as the slugs contact with the work, current immediately passes from one electrode to the other, through the slugs and the work which begins to heat. As soon as a proper temperature is attained and the work has become welded, the switch D is opened. This interrupts the welding current and at the same time interrupts the electromagnet circuit. The electrodes are then removed from the work to which the slugs have attached themselves and the apparatus is ready to make a second weld.

In Fig. 3 a separate switch is provided for the electromagnet circuit. In this case the switch H is first closed to magnetically energize the electrodes. The slugs are then placed on the electrodes and the electrodes forced toward the work. When the slugs and the work are tightly squeezed between the electrodes the switch D is closed, which causes current to flow from one electrode to the other through the slugs and the work and when the welding heat has been attained and the weld completed, both switch H and switch D are opened to interrupt both the welding current and the magnetizing current. The electrodes are then relieved from the work and the apparatus is ready for the next weld.

Figure 5:
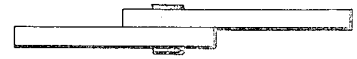
Fig. 5 shows a condition of the work.

When depressions are formed in the electrodes there will be formed projections at the weld as shown in Fig. 5 due to the fact that the slugs can not be pressed flush with the surfaces of the work. In cases where this is objectionable I omit the depressions and concentrically mark the electrodes so as to form a guide in placing the slugs and then depend entirely on the magnetism to maintain the slugs in their proper position until they are securely clamped on the work between the electrodes.

Fig. 4 shows a section of my welding electrode. B is a block of good conducting material such as copper; G is a solenoid surrounding the copper block; F is the depression for locating the slug; A is the slug which is made thick enough to extend beyond the surface of the copper block after it has been placed in the depression. The block B is provided with a threaded hole I for attaching it to the welding machine. A water circulation is also provided so that the copper block will not become unduly heated by being in contact with the heated slug.

My invention enables slug welding to be accomplished with great speed and by unskilled labor.

What I claim as my invention is:—

1. In an apparatus of the character described, an electrode having its contact end or surface provided with means for locating the slug and combined with magnetizing means surrounding said electrode to hold the slug when located in position.

2. In an apparatus of the character described, a welding electrode provided with a depression in its current supplying and pressure applying face and with means for magnetizing said electrode to render said contact face magnetic.

3. In an apparatus of the character described, a welding electrode having a depression formed in its face and magnetizing means applied to said electrode.

4. In an apparatus of the character described, the combination of a welding electrode, means for supplying electric welding current thereto, a magnetizing coil wound on said electrode and means for controlling the supply of welding and magnetizing currents at will.

5. In an apparatus of the character described, the combination with the welding electrode having locating means upon its contact face, of a magnetizing coil, a switch for closing the magnetizing circuit and an independently operable switch for controlling the flow of welding current through said electrode.

6. In an apparatus of the character described, the combination with a welding electrode having a depression in its face to receive the welding means, of a magnetizing coil surrounding said electrode and means for controlling the flow of magnetizing current to magnetize the electrode and hold the welding piece in position on the terminal thereof and for interrupting the magnetizing current on completion of the weld.

7. In an apparatus of the character described, the combination with a welding electrode, of a transformer applying welding current to said electrode, and a magnetizing coil on said electrode arranged in multiple with the primary of the transformer.

Signed at New York in the county of New York and State of New York this 19th day of August A. D. 1919.

JAMES H. GRAVELL.

Witnesses:
W. R. WARNER,
F. G. TOWNSEND.